Nov. 5, 1935.  W. KOHLHAGEN  2,019,683
SELF STARTING SYNCHRONOUS ELECTRIC MOTOR
Filed April 4, 1934   2 Sheets-Sheet 1
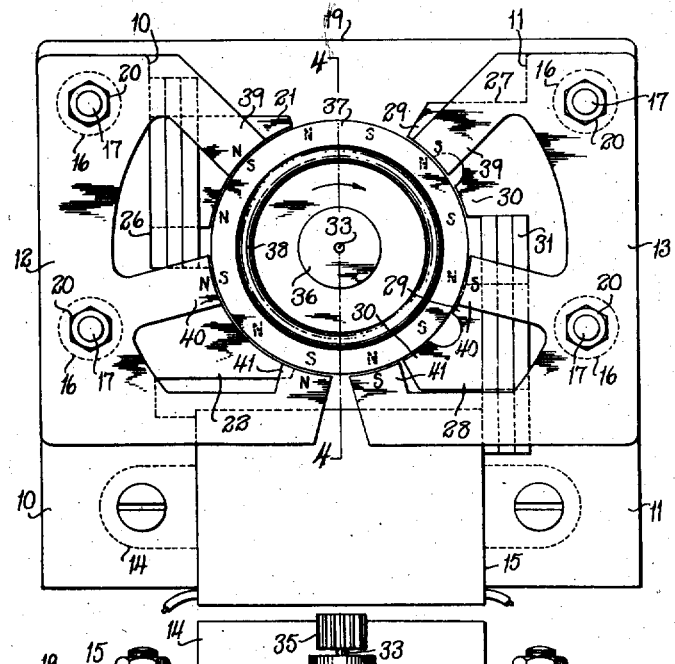

Nov. 5, 1935.                W. KOHLHAGEN                2,019,683
                SELF STARTING SYNCHRONOUS ELECTRIC MOTOR
                     Filed April 4, 1934        2 Sheets-Sheet 2
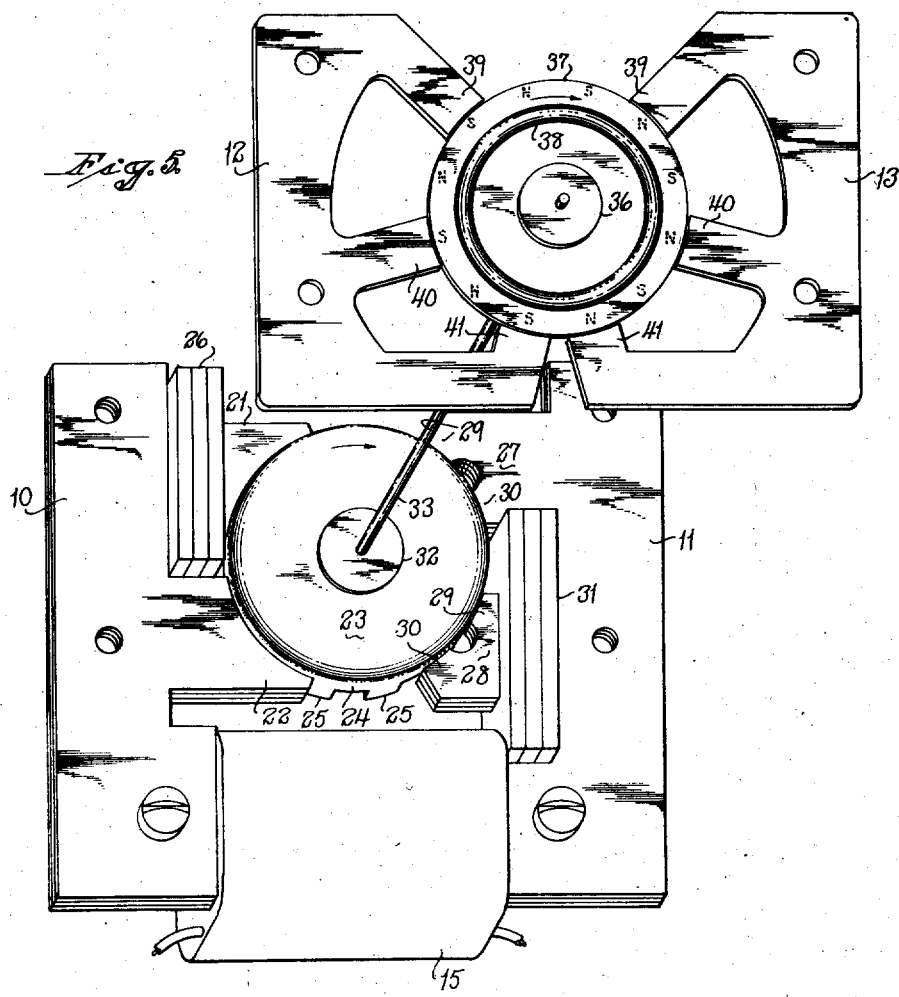
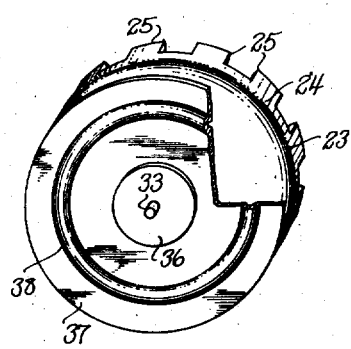

Patented Nov. 5, 1935

2,019,683

UNITED STATES PATENT OFFICE 2,019,683

SELF-STARTING SYNCHRONOUS ELECTRIC MOTOR

Walter Kohlhagen, Waterbury, Conn.

Application April 4, 1934, Serial No. 718,891

6 Claims. (Cl. 172—278)

This invention relates to an improvement in synchronous electric motors and particularly to self-starting synchronous electric motors primarily designed for use in connection with clocks and other time instruments, though not so limited.

Self-starting synchronous electric motors, when constructed so as to have sufficient self-starting torque under various operating conditions, are prone to jump to a speed above their intended synchronous speed, with the result that they fail to discharge their proper time functions.

One of the objects of the present invention is to provide a superior self-starting synchronous electric motor, which while having ample self-starting torque, nevertheless is substantially proof against jumping to super-synchronous speeds under operating conditions, such, for instance, as when subjected to a varying load, as in a strike clock.

A further object is to provide a self-starting synchronous electric motor having superior torque at relatively-low synchronous speed.

Another object is to provide a superior self-starting synchronous electric motor which may be relied upon to start from rest and accelerate to synchronous speed despite appreciable loads, when connected to a source of current of proper voltage and frequency.

Other objects and advantages will appear to those skilled in the art from the following, considered in conjunction with the accompanying drawings and the appended claims.

In the accompanying drawings:

Fig. 1 is a face view of one form which a self-starting synchronous electric motor may assume in accordance with the present invention;

Fig. 2 is a top edge view thereof;

Fig. 3 is a vertical sectional view taken on the line 3—3 of Fig. 2;

Fig. 4 is a broken fragmentary sectional view taken on the line 4—4 of Fig. 1;

Fig. 5 is a schematic perspective view showing the parts in extended positions; and Fig. 6 is a perspective view partly in section of the rotor-unit, detached.

The particular self-starting synchronous electric motor herein chosen as illustrative of the present invention includes a compound stator structure having a pair of complementary pole-pieces 10 and 11 of iron or other suitable magnetic material, which for convenience of description may be referred to as "primary" pole-pieces, and a pair of complementary pole-pieces 12 and 13 of iron or the like which may be designated as "secondary" pole-pieces. The lower ends of the primary pole-pieces 10 and 11 are interconnected by a laminated core-piece 14 mounting the usual electromagnet coil 15, while the secondary pole-pieces 12 and 13 are free of such interconnection, for reasons as will hereinafter appear.

The primary pole-pieces 10 and 11 and the secondary pole-pieces 12 and 13 are laterally spaced from each other by spacing-bushings 16 sleeved over the reduced rear ends 17 of studs 18 riveted to and rearwardly-offsetting from a mounting-plate 19. Suitable nuts such as 20, one of which is applied to the threaded rear end of each of the studs 18, serve to retain the pole-pieces 12—13, the spacing-bushings 16 and the pole-pieces 10—11 in place.

Preferably, the bushings 16, studs 18 and plate 19 are formed of brass or other non-magnetic material, so as to minimize magnetic leakage.

The primary pole-piece 10 is formed with two salient-poles 21 and 22 respectively having their inner faces curved to substantially conform to the peripheral curvature of a cup-shaped rotor-member 23 of magnetic material and having a laterally-extending flange 24 which is notched to produce an annular series of equidistant salient-poles 25 magnetically acted upon by the salient-poles 22 of the primary pole-piece 10 before referred to. As shown, the salient-pole 21 has sleeved over it a plurality of washer-like shading-coils 26 serving to cause a time-lag of the magnetic flux in the manner common to split-phase electric motors.

The primary pole-piece 11 complementing the primary pole-piece 10, and located on the opposite side of the cup-shaped rotor-member 23 therefrom, is provided with salient-poles 27 and 28 having their concave inner faces located closely adjacent the periphery of the cup-shaped rotor-member 23. Each of the said salient-poles 27 and 28 is notched to create spaced polar-terminals 29 and 30 and the latter salient-pole is provided with a plurality of disk-like shading-coils 31 serving to displace the flux passing through the said salient-pole 28 as compared to that passing through the said salient-pole 27.

As thus constructed and arranged, the primary pole-pieces 10 and 11 magnetically act upon the rotor-member 23 with a rotating-field effect to turn the said rotor-member in the direction indicated in the drawings. Owing largely to the laterally-extending salient-poles 25 of the rotor-member 23 and the spacing of the polar-terminals 29 and 30, the turning effect referred to will be synchronous, i. e., effecting the turning of the said rotor-member at a speed of 600 R. P. M. with 60-cycle current in the particular motor-structure herein illustrated.

The cup-shaped rotor-member 23 before described is mounted upon a collet 32 preferably of brass or similar material, and the latter in turn is staked upon a rotor-shaft 33 turning in a bearing-bushing 34 mounted with a drive-fit in the mounting-plate 19, and rearwardly offsetting therefrom and projecting slightly forwardly therethrough. At its forward end, the rotor-shaft 33 is provided with a pinion 35 by means of which the power of the motor may be taken off to drive a clock mechanism or the like.

The rear end of the said rotor-shaft 33 has staked to it a collet 36 of brass or similar material which in turn has secured to it a disk-like rotor-member 37 of permanent magnet material, such as glass-hard steel, and formed in its face adjacent its periphery with an annular stiffening-rib or bead 38.

The rotor-member 37 is free or substantially free of salient-poles and acts, for the purpose as will hereinafter appear, by its capacity for having polar spots impressed upon it adjacent its periphery (as indicated by broken lines in Figs. 1 and 5) and retained thereon with appreciable resistance to change or displacement by virtue of its permanent magnet character. The rotor-member 37 now being discussed will be designated for convenience of description as the "hysteresis" rotor-member and is located in line with the secondary pole-pieces 12 and 13, so as to be magnetically acted upon by the same. The said secondary pole-pieces 12 and 13 are of corresponding and interchangeable form and size, and each is provided with three (more or less) salient-poles 39, 40 and 41 projecting to a position closely adjacent the periphery of the hysteresis rotor-member before referred to.

By reference to Figs. 1 and 5, it will be seen that the salient-poles 39, 40 and 41 of a given one of the secondary pole-pieces 12 and 13 are spaced from each other a distance equivalent to the space between two polar spots of like polarity on the hysteresis rotor-member 37, so that the said rotor-member rotates one-twelfth turn for each one-half cycle, rather than double that speed, which would be the case were the intermediate salient-poles 40 of opposite polarity from the polarity of their companion salient-poles 39 and 41.

The secondary pole-pieces 12 and 13 in the construction herein chosen for illustration are magnetized solely by stray magnetic flux from the coil 15 and the primary pole-pieces 10 and 11, but by virtue of this stray flux these pole-pieces and their salient-poles 39, 40 and 41 exert sufficient synchronous torque upon the hysteresis rotor-member 37 to confine the speed thereof and hence the speed of the entire rotor-unit, comprising the parts 24, 33 and 37, to a synchronous speed of 600 R. P. M.

Under certain conditions, if desired, the secondary pole-pieces 12 and 13 may be magnetically connected to the primary pole-pieces 10 and 11, such, for instance, as by making the stud-ends 17 and/or the bushings 16 of magnetic material, but I have found that the magnetic "isolation," so to speak, of the said secondary pole-pieces 12 and 13 is preferable in structures having the proportions of that shown in the accompanying drawings. As will be apparent from the foregoing, the salient-poles 39, 40 and 41 (which appropriately may be designated as secondary salient-poles) produce a stationary-axis alternating-field owing to the absence of shading-coils therefrom, in contradistinction to the rotating-field effect produced by the primary salient-poles 21, 22, 27 and 28 before referred to.

When current of the proper voltage and frequency is supplied to the coil 15, the primary salient-poles 21, 22, 27 and 28 will exert a turning effect upon the rotor-member 23 and bring the same up to synchronous speed, which in the structure illustrated with a 60-cycle current, would be 600 R. P. M. Simultaneously with the creation of the rotating magnetic field as just described, a stationary-axis alternating-field will be created by the secondary salient-poles 39, 40 and 41 of the respective secondary pole-pieces 12 and 13, but the interlocking tendency between the said salient-poles and the hysteresis rotor-member 37 will be insufficient to materially retard the speeding-up of the rotor-unit (comprising the members 24, 33 and 37) to the synchronous speed as above described. The synchronizing effect of the secondary salient-poles 39, 40 and 41 upon the rotor-member 37, once synchronous speed is reached, will be sufficient to effectively prevent the over-speeding of the entire rotor-unit under practically all operating conditions, such, for instance, as in a strike clock when the motor structure might be subjected to sudden changes in loads.

The invention may be carried out in other specific ways than that herein set forth without departing from the spirit and essential characteristics of the invention, and the present embodiment is, therefore, to be considered in all respects as illustrative and not restrictive, and all changes coming within the meaning and equivalency range of the appended claims are intended to be embraced therein.

I claim:

1. A self-starting synchronous electric motor device including in combination a rotor-unit having a portion provided with salient-poles and a hysteresis portion of permanent magnet material substantially free of salient-poles and having remanent polar-spots thereon; and a stator structure having primary salient-poles producing a starting and a synchronous effect upon the portion of the said rotor having salient-poles, the said stator structure also having secondary salient-poles producing a stationary-axis alternating-field effect upon the permanent-magnet hysteresis portion of the said rotor-unit which is substantially free of salient-poles.

2. A self-starting synchronous electric motor device including in combination a rotor-unit having a portion provided with salient-poles and a hysteresis portion of permanent magnet material substantially free of salient-poles and having remanent polar-spots thereon; and a stator structure having primary salient-poles producing a starting and a synchronous effect upon the portion of the said rotor having salient-poles, the said stator structure also having secondary salient-poles producing a stationary-axis alternating-field effect upon the permanent-magnet hysteresis portion of the said rotor-unit which is substantially free of salient-poles; the said secondary salient-poles being arranged with poles of the same instantaneous polarity adjacent and acting on said rotor-unit to restrain the same from super-synchronous speed.

3. A self-starting synchronous electric motor device including in combination a rotor-unit having a portion provided with salient-poles and an axially-displaced hysteresis portion of permanent magnet material substantially free of salient-poles and having remanent polar-spots thereon; and a stator structure having primary salient-poles producing a starting and a synchronous effect upon the portion of the said rotor having salient-poles, the said stator structure also having secondary salient-poles producing a stationary-axis alternating-field effect upon the permanent-magnet hysteresis portion of the said rotor-unit which is substantially free of salient-poles.

4. A self-starting synchronous electric motor device including in combination a rotor-unit having a portion provided with salient-poles and a hysteresis portion of permanent magnet material substantially free of salient-poles and having remanent polar-spots thereon; and a stator-structure having primary salient-poles producing a starting and a synchronous effect upon the portion of the said rotor-unit having salient-poles, the said stator structure also having a pair of complementary secondary pole-pieces, each provided with a plurality of secondary salient-poles producing a stationary-axis alternating-field effect upon the permanent-magnet hysteresis portion of the said rotor-unit which is substantially free of salient-poles; the said secondary salient-poles of each secondary pole-piece being spaced apart a distance equivalent to the normal distance between two polar-spots on the adjacent hysteresis portion of the said rotor-unit.

5. A compound self-starting synchronous-motor device, including in combination: a first set of stator-poles producing a rotating-field effect; a second set of stator-poles producing a substantially-stationary-axis alternating-field effect; a first rotor-portion cooperating with the said first set of stator-poles and providing both self-starting and synchronous torque; and a second rotor-portion cooperating with the said second set of stator-poles and having magnetic characteristics producing substantially zero lock-in torque at zero speed, and marked synchronous torque at the synchronous speed of the said first rotor-portion.

6. A self-starting synchronous motor device including in combination: a primary rotor member; a secondary hysteresis rotor member connected to the said primary rotor member and formed of permanent magnet material substantially free of salient poles and having remanent polar spots impressed therein of regularly-alternating polarity under normal operating conditions; and a stator structure having means exerting a starting and synchronizing effect upon the said primary rotor member and also having means producing a synchronizing effect upon the said secondary rotor member including salient poles spaced apart a distance at least equal to the distance between two spots of like polarity on the said secondary rotor member and acting in conjunction with the polar spots on the latter rotor member to restrain the said primary rotor member from super-synchronous speed.

WALTER KOHLHAGEN.